United States Patent [19]
Coghlan et al.

[11] Patent Number: 6,111,362
[45] Date of Patent: Aug. 29, 2000

[54] CONTROLLING COLOR SHIFT IN EL PHOSPHORS

[75] Inventors: William A. Coghlan, Tempe; Charles I. Zovko, Chandler; Edward L. Kinnally, Gilbert, all of Ariz.

[73] Assignee: Durel Corporation, Chandler, Ariz.

[21] Appl. No.: 09/186,578

[22] Filed: Nov. 5, 1998

[51] Int. Cl.$^7$ .................................................. G09G 3/10
[52] U.S. Cl. ................................. 315/169.3; 315/209 R; 315/291; 315/176; 315/169.1
[58] Field of Search ................. 315/169.3, 291, 315/209 R, 160, 169.1, 174, 176, 226, 283

[56] References Cited

U.S. PATENT DOCUMENTS

| | | | |
|---|---|---|---|
| 4,253,097 | 2/1981 | Hochstrate | 315/169.3 X |
| 4,527,096 | 7/1985 | Kindlmann | 315/169.3 |
| 5,313,141 | 5/1994 | Kimball | 315/169.3 |
| 5,349,269 | 9/1994 | Kimball | 315/169.3 |
| 5,502,357 | 3/1996 | Kimball | 315/209 R |

OTHER PUBLICATIONS

Thornton, W.A.; "*Electroluminescence Maintenance*"; J. Electrochem. Soc.; 107 (1960) 895.
Eckersley, R.T. et al.; "*Emission Spectra Analysis . . .* "; SID 93 Digest; pp. 588–591; (1993).
Eckersley, R.T. et al.; "*Analysis of Voltage and Frequency Dependence . . .* "; Proc. 6th EL Workshop; pp. 274–279; (May 1992).
Ichihara, T. et al.; "*Spectral Characteristics . . .* "; 6th EL Workshop; translation; (May 1992).
Matossi, F. et al.; "*Electroluminescence Excited by Short Field Pulses*"; Physical Review; vol. 99, No. 4; pp. 1100–1103; (1955).

*Primary Examiner*—Haissa Philogene
*Attorney, Agent, or Firm*—Paul F. Wille

[57] ABSTRACT

An EL lamp is powered by bursts of high frequency signal repeated at low frequency, i.e. having a low duty cycle envelope, in order to shift the color of light emitted by the phosphor in the lamp without degrading the life of the lamp. The bursts include one or more consecutive cycles of a high frequency signal or several closely spaced cycles of a high frequency signal.

9 Claims, 4 Drawing Sheets

CONTROLLING COLOR SHIFT IN EL PHOSPHORS

BACKGROUND

This invention relates to electroluminescent (EL) lamps and, in particular, to producing a color shift in the light emitted by an EL phosphor without significantly affecting the life of the lamp.

An EL panel is essentially a capacitor having a dielectric layer between two conductive electrodes, one of which is a transparent metal layer, such as indium tin oxide (ITO). The dielectric layer includes a copper doped ZnS phosphor powder or there is a separate layer of phosphor powder adjacent the dielectric layer. The phosphor powder radiates light in the presence of a strong electric field, using very little current. Because an EL lamp is a capacitor, alternating current must be applied to the electrodes to cause the phosphor to glow, otherwise the lamp charges to the applied voltage, current through the lamp ceases, and the lamp stops producing light.

EL phosphor particles are zinc sulfide-based materials, commonly including one or more compounds such as copper sulfide ($Cu_2S$), zinc selenide (ZnSe), and cadmium sulfide (CdS) in solid solution within the zinc sulfide crystal structure or as second phases or domains within the particle structure. EL phosphors commonly contain moderate amounts of other materials such as dopants, e.g., bromine, chlorine, manganese, silver, etc., as color centers, as activators, or to modify defects in the particle lattice to modify properties of the phosphor as desired. A copper-activated zinc sulfide phosphor produces blue and green light under an applied electric field and a copper/manganese-activated zinc sulfide produces orange light under an applied electric field. Together, the phosphors produce white light under an applied electric field.

$Cu_xS$ is a p-type semiconductor whereas ZnS:Cu,h (h=Cl, Br, I) is an n-type semiconductor. Needles of $Cu_xS$ deform an applied electric field, causing the local field strength to be as much as one thousand times higher than the average field strength. The color of the resulting light emission is determined by the doping levels. Although understood in principle, the luminance of an EL phosphor particle is not understood in detail. The luminance of the phosphor degrades with time and usage, more so if the phosphor is exposed to moisture or high frequency (greater than 1,000 hertz) alternating current.

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, on the field strength within the phosphor powder. The efficiency of the inverter affects battery life and lamp brightness.

The frequency of the alternating current through an EL lamp affects the life of the EL lamp, with frequencies between 200 hertz and 1,000 hertz being preferred. Ionic migration occurs in the phosphor at frequencies below 200 hertz. Above 1,000 hertz, the life of the phosphor decreases at a rate that is inversely proportional to frequency.

Because EL lamps provide uniform luminance and consume very little power, there is a great demand for EL lamps in displays. There is also a great demand for a variety of colors, which is difficult to meet from a limited number of phosphors. The color of a phosphor is a quantum mechanical phenomenon which, by definition, does not provide a continuous spectrum of colors. Mixing different phosphors, "cascading" phosphors (using the light from a phosphor to stimulate a fluorescent dye), and filtering are three of several techniques known in the art for obtaining colors other than the strongest emission band of a particular phosphor.

Any manipulation of a phosphor involves tradeoffs. Typically, various colors are obtained at the expense of brightness. Often, the life (time to half brightness) of a phosphor is also reduced. It is known that the color of a blue-green phosphor shifts toward blue as the drive frequency increases and the life of the phosphor decreases with increasing frequency; e.g. time to half brightness at 4,000 hertz is approximately one fourth the time at 1,000 hertz.

In view of the foregoing, it is therefore an object of the invention to provide a blue EL lamp having longer life and higher luminance than blue EL lamps of the prior art.

Another object of the invention is to provide an apparatus and method for varying the colors of EL lamps without substantially changing life or luminance.

A further object of the invention is to provide a technique for shifting the color emitted by an EL phosphor or phosphor mixture.

Another object of the invention is to provide a technique for shifting the color of light emitted from cascaded EL phosphors.

A further object of the invention is to improve the efficiency of battery powered inverters for EL lamps.

SUMMARY OF THE INVENTION

The foregoing objects are achieved in this invention in which an EL lamp is powered by bursts of high frequency signal repeated at low frequency, i.e. having a low duty cycle envelope, in order to shift the color of light emitted by the phosphor in the lamp. The bursts include one or more consecutive cycles of a high frequency signal or several closely spaced cycles of a high frequency signal.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
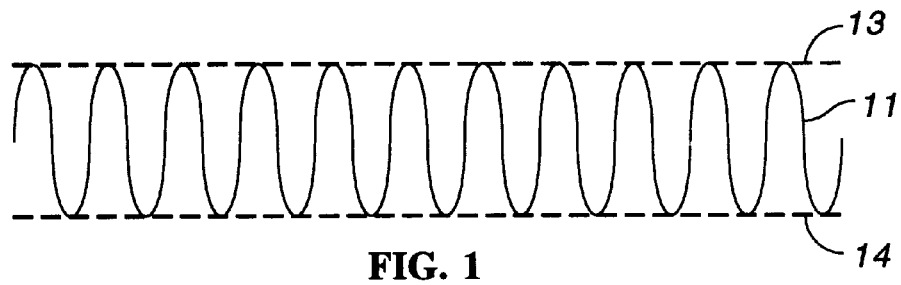
FIG. 1 represents a continuous high frequency signal having an envelope.

FIG. 1 illustrates a sinusoidal waveform 11 representing a high frequency carrier signal, e.g. 4,000 hertz. The envelope of the carrier signal, represented by dashed lines 13 and 14, is a constant. Applying a signal such as this to an EL lamp made from blue-green phosphor would cause the lamp to emit more blue light than the same lamp driven at 200 hertz but the life of the EL lamp would be shortened significantly, e.g. to less than one fourth of the life of the lamp driven at 200 hertz.

Figure 2:
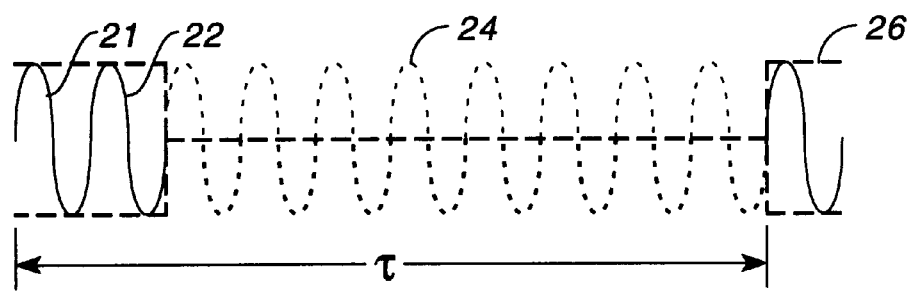
FIG. 2 represents a pulsed high frequency signal.

In accordance with the invention, an EL lamp is driven by a high frequency carrier having a low frequency envelope. In particular, the lamp is driven with bursts of high frequency signal (e.g., >1,000 hertz) and the bursts recur at low frequency (e.g., 30–1,000 hertz). Such a signal is illustrated in FIG. 2. For example, cycles 21 and 22 of high frequency signal 24 are applied to an EL lamp per period tau (τ), where τ is the period of a low frequency signal. The result is a distinct shift toward a more blue color and a slight decrease in brightness. Envelope 26 has a low duty cycle, less than approximately fifty percent.

Driving an EL lamp at a high frequency will ordinarily increase the luminance of the lamp. Because of the low duty cycle of the bursts, luminance is reduced. Luminance is increased by increasing the voltage of the bursts. An increased voltage will slightly decrease the life of an EL lamp but the effect is much less pronounced than the effect of increasing frequency.

Figure 3:
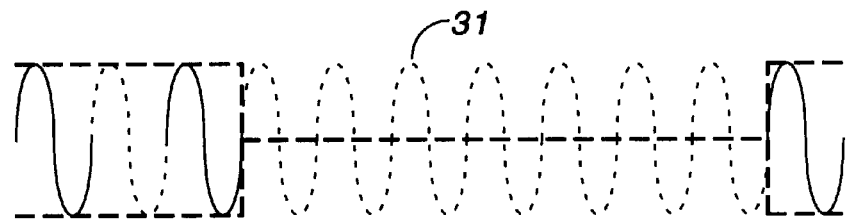
FIG. 3 represents another form of pulsed high frequency signal.

One or more cycles of high frequency can be used per period τ and the cycles need not be continuous. As illustrated in FIG. 3, two cycles, shown in solid line, of high frequency signal 31, shown in dashed line, are applied to an EL lamp. The result is the same, a distinct shift in color toward blue without adversely affecting the life of the EL lamp.

Figure 4:
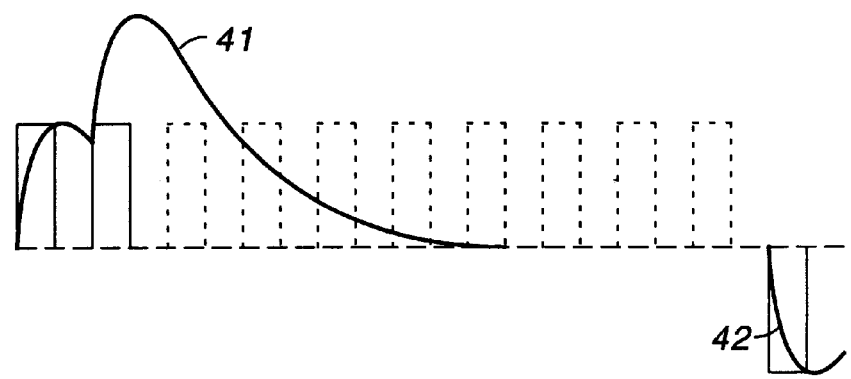
FIG. 4 represents the envelope from the pulsed output of a battery powered inverter.

Supplied from an AC generator or high frequency oscillator, a high frequency signal is sinusoidal and symmetrical about ground or common. The invention also works with inverters supplying unidirectional pulses. As illustrated in FIG. 4, a first series of high frequency pulses is applied to an EL lamp, with each pulse charging the lamp. Only two high frequency pulses are applied and then the lamp discharges until pulses of the opposite polarity are applied. As indicated by waveform 41, the voltage on an EL lamp increases with each applied pulse. As indicated by waveform 42, the succeeding burst of pulses charges the lamp to the opposite polarity, thereby applying an alternating current to the lamp.

The duty cycle of the high frequency pulses is determined by the circuit supplying the pulses. The duty cycle of the envelope of the pulses is low, less than approximately fifty percent. As described in connection with FIG. 3, one or more pulses can be applied and the pulses need not be consecutive but should be relatively close to each other to maintain a low duty cycle for the envelope. The duty cycle at lower burst frequencies can be longer than at higher burst frequencies because lower burst frequencies are less harmful to an EL lamp. For example, ten cycles at 5,000 hertz have a shorter duty cycle than ten cycles at 1,000 hertz, assuming the same burst repetition rate. Ten cycles at 1,000 hertz may result in a duty cycle greater than fifty percent but such is acceptable.

Figure 5:
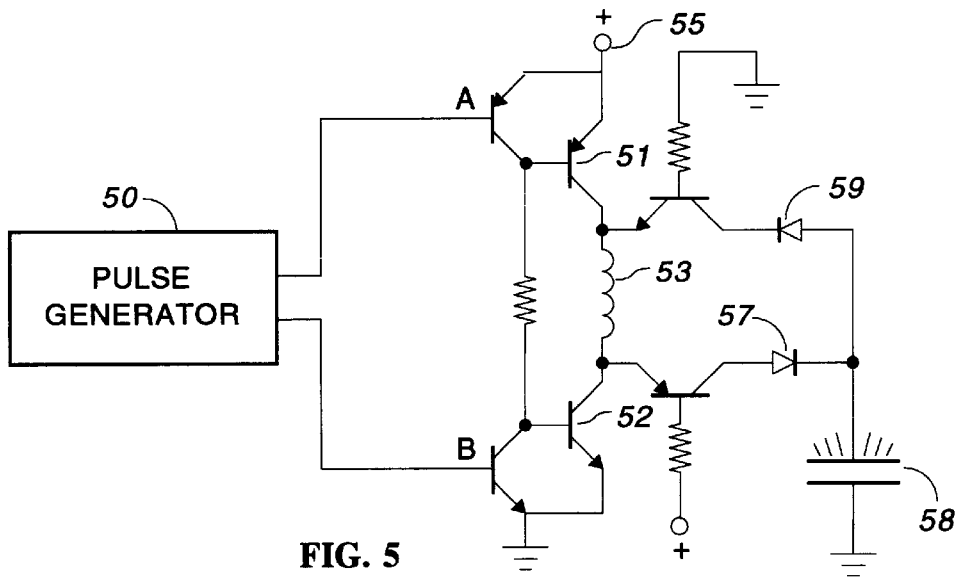
FIG. 5 is a partial schematic of an inductive boost inverter having a single ended output.

FIG. 5 illustrates a switched inductor boost circuit for supplying pulses to a lamp. The right hand portion of the circuit is known in the art, see U.S. Pat. No. 5,313,141 (Kimball). Transistors 51 and 52 are connected in series by inductor 53 between supply 55 and ground. If transistor 51 is turned on and held on while transistor 52 is pulsed, positive pulses are coupled through diode 57 to EL lamp 58. If transistor 52 is turned on and held on while transistor 51 is pulsed, negative pulses are coupled through diode 59 to EL lamp 58.

Pulse generator 50, which can be any programmable pulse generator or microcontroller, provides appropriate signals for modulating the high frequency carrier pulses. In the prior art, transistor 51 remains conducting until the end of a half cycle of the low frequency. In the invention, transistor 51 is turned off after transistor 52 has been pulsed twice (in the particular example illustrated in FIG. 4) and remains off for the duration of the half cycle. Similarly, transistor 52 is turned off after transistor 51 has been pulsed twice, thus producing the waveform illustrated in FIG. 4.

In FIG. 5, one electrode of lamp 58 is grounded and either positive or negative pulses are applied to the other electrode. In the circuit shown in FIG. 6, the lamp is connected across the AC diagonal of a bridge circuit and the pulses from an inductive boost circuit are applied to the DC diagonal of the bridge; see U.S. Pat. No. 4,527,096 (Kindlmann).

Figure 6:
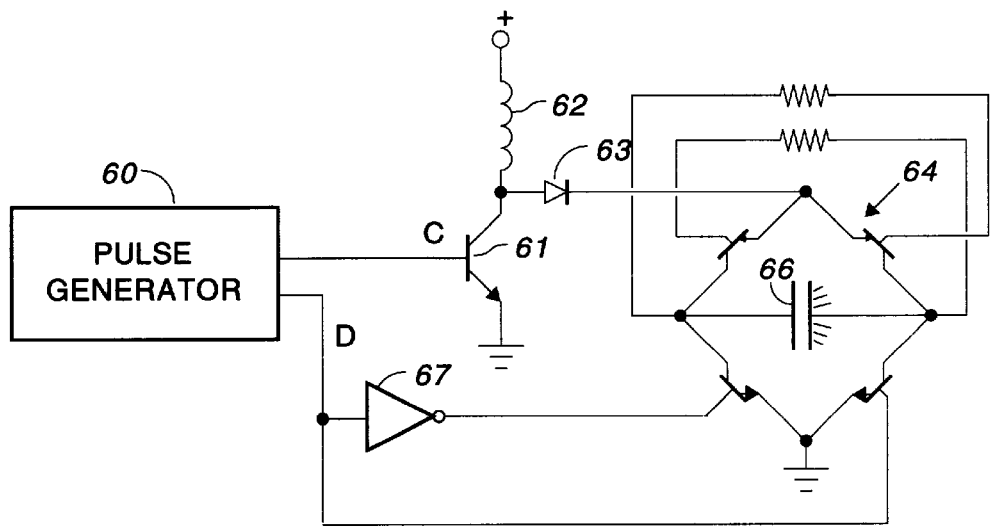
FIG. 6 is a partial schematic of an inductive boost inverter having a bridge output.

In FIG. 6, pulse generator 60 provides high frequency pulses on line C to transistor 61, which is connected in series with inductor 62 between supply and ground. Each time that transistor 61 turns off, a positive pulse is coupled through diode 63 to the DC diagonal of bridge 64. Low frequency pulses on line D, and through inverter 67, determine the polarity of the pulses applied to EL lamp 66 by causing opposite arms of the bridge to conduct alternately. Pulse generator 60 can be any suitable source of pulses for producing the sequences illustrated in FIGS. 2, 3, and 4.

Figure 7:
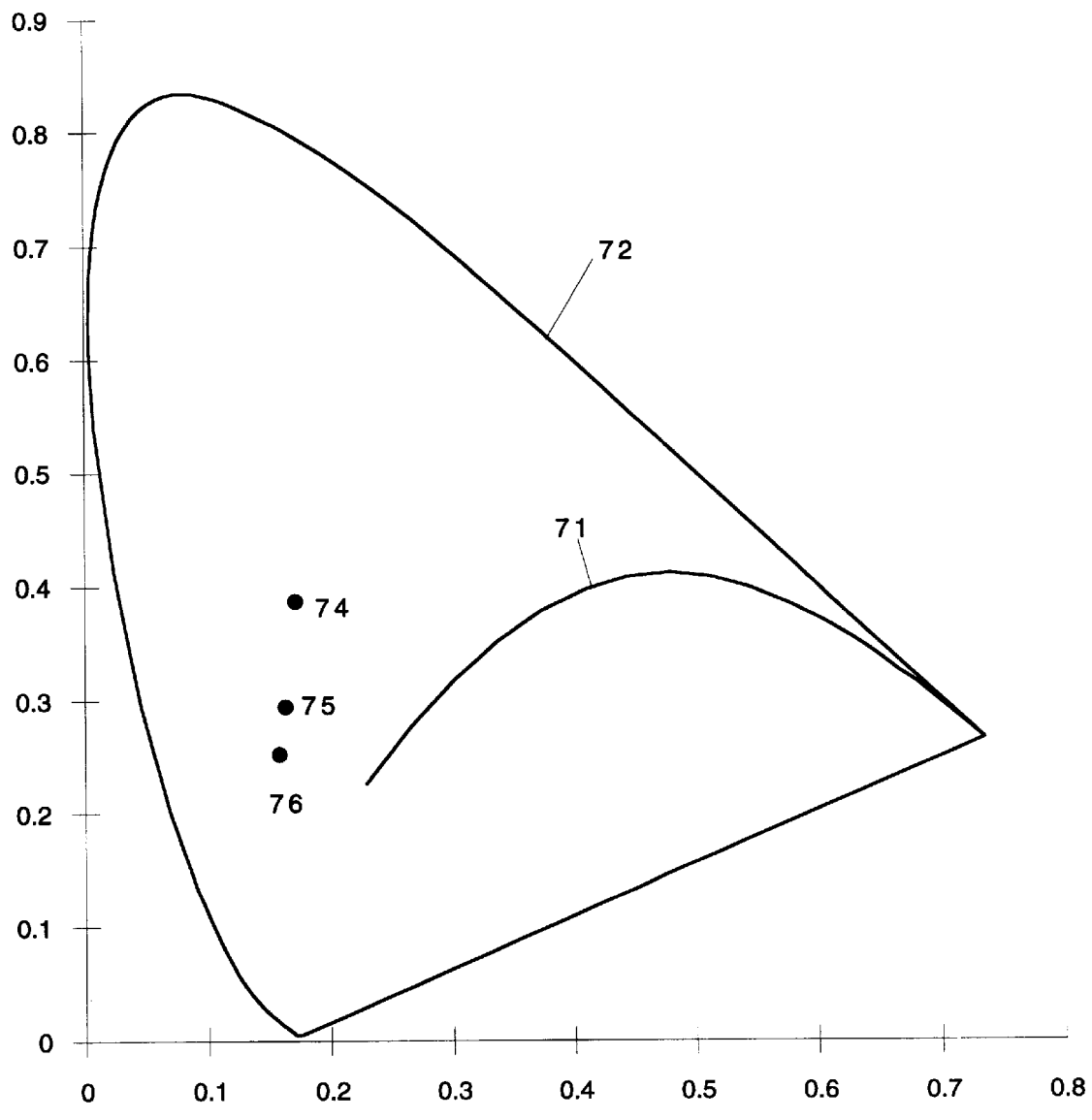
FIG. 7 is a CIE chromaticity diagram.

FIG. 7 is a standard CIE chromaticity diagram in which color is represented in an x-y coordinate system. Curve 71 represents the spectral emission of a black body at various temperatures, progressing from red, at the lower right hand corner of the curve, to white, at the left hand end of the curve. Curve 72 is the chromaticity curve extending from blue, at 0.176, 0.005, to green at 0.082, 0.834, to red at 0.735, 0.265. The curve is typically closed from red to blue, although the colors along this line occur artificially.

In tests conducted on EL lamps all constructed in the same way and containing the same blue-green phosphor, some lamps were driven at 400 hertz sine wave, some at 2,000 hertz sine wave, and some at 2,000 hertz pulsed at 400 hertz. The voltage was adjusted for all the lamps to have equal initial luminance (14.4 fL). The lamp run at 400 Hz. had the color coordinates, x=0.171, y=0.387, represented by dot 74. The lamp run with pulsed 2,000 hertz signal had the color coordinates x=0.163, y=0.294, represented by dot 75. The lamp run with steady 2,000 hertz signal had color coordinates x=0.158, y=0.252, represented by dot 76. The lamps driven with the pulsed high frequency signal were clearly more blue than the lamps driven with 400 hertz. Thus, color was achieved but color is only half the story.

The lamps represented by dot 76 had an average life of only 238 hours. At this point the lamps driven with intermittent high frequency were at 63% of initial luminance and the lamps driven at 400 Hz were at 66% of initial luminance. The lamps represented by dots 74 and 75 are expected to have a lifetime of about 1000 hours, based upon the slope of the life curves at 238 hours. Thus, lamps driven in accordance with the invention have a life four times longer than the life of lamps driven in accordance with the prior art.

By pulsing the high frequency signal applied to an EL lamp, one improves the efficiency of the inverter because the inverter is no longer running continuously yet the lamp continues to emit light for a brief time due to the persistence of the phosphor.

The bursts of high frequency can be combined with a low frequency signal to increase luminance and produce a less pronounced color shift. Stated another way, one can drive an EL lamp in accordance with the invention by supplying bursts of different frequencies seriatim, e.g. 400 hertz, then 1,200 hertz, and then 4,000 hertz to produce a desired color. The bursts can be separated or contiguous. If the bursts are contiguous, a lamp is powered continuously. The bursts need not all be the same voltage and, for the reasons described above, are preferably not the same voltage. Lower frequency bursts are of a lower voltage than higher frequency bursts.

Figure 8:
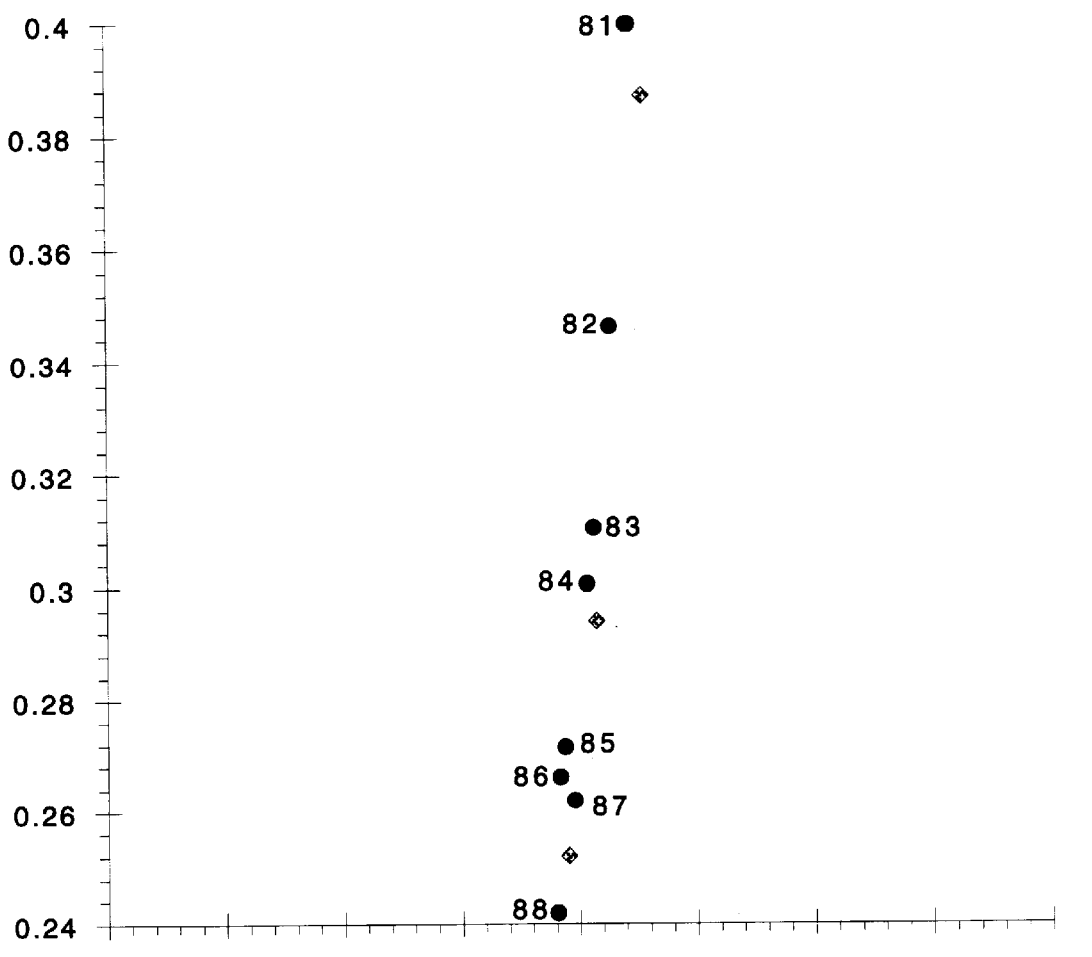
FIG. 8 is a portion of a CIE chromaticity diagram.

The waveform of the carrier signal is not critical. For example, sine waves, square waves, sawtooth waves, or triangular waves can be used, individually or in combination. FIG. 8 is a portion of a chromaticity diagram showing the colors produced by a lamp driven by various waveforms and frequencies. The open diamonds represent the data from FIG. 7. Dot 81 represents the color resulting from driving the lamp with a sinusoidal waveform at 400 hertz. Essentially the same color resulted from driving the lamp with a triangular waveform at 400 hertz. Dot 82 represents the color resulting from driving the lamp with a sawtooth waveform at 400 hertz. Dot 83 represents the color resulting from driving the lamp with a single cycle of sinusoidal waveform at 2,000 hertz repeated at 400 hertz. Dot 84 represents the color resulting from driving the lamp with a single cycle of triangular waveform at 2,000 hertz repeated at 400 hertz. Dot 85 represents the color resulting from driving the lamp with a sinusoidal waveform at 2,000 hertz. Dot 86 represents the color resulting from driving the lamp with a triangular waveform at 2,000 hertz. Dot 87 represents the color resulting from driving the lamp with a single cycle of sawtooth waveform at 2,000 hertz repeated at 400 hertz. Dot 88 represents the color resulting from driving the lamp with a sawtooth waveform at 2,000 hertz.

For the test results illustrated in FIG. 8, no attempt was made to maintain a particular luminosity nor was lifetime measured because neither parameter affects color. On the other hand, the waveform very much affects life. In particular, a sawtooth waveform is believed to shorten life more than a sinusoidal signal of the same frequency.

Having a brighter blue enables one to provide colors not previously obtainable, e.g. purple, which is actually a mixture of red and blue. Such an EL lamp is now feasible, e.g. using cascaded phosphors. Other novel color combinations can also be provided.

The invention thus provides a blue EL lamp having longer life and higher luminance than blue EL lamps of the prior art. One can vary the color of an EL lamp without substantially changing life or luminance. The invention works with a single EL phosphor, a mixture of phosphors, or cascaded phosphors. In addition to enabling one to provide colors not previously obtainable in useful brightness and life, e.g. purple, the efficiency of battery powered inverters is improved.

Having thus described the invention, it will be apparent to those of skill in the art that various modifications can be made within the scope of the invention. For example, although illustrated as providing zero volts during the off time of the duty cycle, one could supply a low voltage to the lamp rather than zero volts.

What is claimed as the invention is:

1. A method for shifting the color of light produced by at least one phosphor in an EL lamp, said method comprising the steps of:
   producing a first signal having a first frequency;
   producing a second signal having a second frequency wherein said second frequency is higher than the first frequency;
   alternately applying the first signal and the second signal to the EL lamp.

2. The method as set forth in claim 1 wherein said first signal and said second signal are separated by a predetermined interval.

3. The method as set forth in claim 1 wherein the frequency of the first signal is in the range of 30–1,000 hertz and the frequency of the second signal is greater than 1,000 hertz.

4. The method as set forth in claim 1 wherein the first signal and the second signal are applied alternately to the lamp and the lamp is powered continuously.

5. A method for adjusting the color of light produced by at least one phosphor in an EL lamp, said method comprising the steps of:
   producing a first electrical signal having a first frequency carrier and a low frequency envelope;
   producing a second electrical signal having a second frequency carrier and a low frequency envelope;
   wherein the first electrical signal is at a higher frequency than the second electrical signal and the second electrical signal is at a higher frequency than the low frequency envelope;
   applying either the first electrical signal or the second electrical signal to the EL lamp, whereby the first electrical signal, when applied, causes the EL lamp to emit a bluer light than when the second electrical signal is applied to the EL lamp.

6. The method as set forth in claim 5 wherein the amplitude of the first electrical signal is greater than the amplitude of the second electrical signal.

7. The method as set forth in claim 5 wherein the low frequency envelope has a fifty percent duty cycle and said applying step includes alternately applying the first electrical signal and the second electrical signal to the EL lamp for continuously powering the EL lamp.

8. The method as set forth in claim 5 and further including the steps of:
   producing a third electrical signal having a third frequency carrier and a low frequency envelope;
   wherein the third frequency is different from the first frequency and the second frequency; and
   wherein said applying step includes applying one of the first electrical signal or the second electrical signal or the third electrical signal to the EL lamp.

9. The method as set forth in claim 5 wherein said applying step includes the step of alternating the direction of the signals through the EL lamp by means of a bridge circuit.

* * * * *